(12) United States Patent
Gorantla et al.

(10) Patent No.: US 12,236,485 B2
(45) Date of Patent: Feb. 25, 2025

(54) METHOD AND SYSTEM FOR PROVIDING PORTFOLIO DEVIATION ANALYTICS

(71) Applicant: JPMorgan Chase Bank, N.A., New York, NY (US)

(72) Inventors: Chandra Gorantla, Sugar Land, TX (US); Sumit Khanna, East Windsor, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/457,678

(22) Filed: Dec. 6, 2021

(65) Prior Publication Data

US 2023/0177609 A1    Jun. 8, 2023

(51) Int. Cl.
*G06Q 40/06* (2012.01)
*G06Q 40/04* (2012.01)

(52) U.S. Cl.
CPC .......... *G06Q 40/06* (2013.01); *G06Q 40/04* (2013.01)

(58) Field of Classification Search
CPC ............................. G06Q 40/06; G06Q 40/04
See application file for complete search history.

(56) References Cited

U.S. PATENT DOCUMENTS

| | | | |
|---|---|---|---|
| 10,415,605 B1 * | 9/2019 | Benzschawel | F15B 7/001 |
| 10,504,176 B2 * | 12/2019 | Gastineau | G06Q 40/04 |
| 2004/0210504 A1 * | 10/2004 | Rutman | G06Q 40/04 |
| | | | 705/37 |
| 2007/0294158 A1 * | 12/2007 | Patel | G06Q 40/06 |
| | | | 705/36 R |
| 2009/0276372 A1 * | 11/2009 | Wallman | G06Q 40/06 |
| | | | 705/36 R |
| 2009/0292649 A1 * | 11/2009 | Somech | G06Q 40/02 |
| | | | 705/36 R |
| 2016/0125547 A1 * | 5/2016 | Dubeau | G06Q 40/08 |
| | | | 705/4 |
| 2016/0127808 A1 * | 5/2016 | Wong | H04M 15/08 |
| | | | 379/112.04 |
| 2016/0358259 A1 * | 12/2016 | Cucchiara | G06Q 40/06 |
| 2020/0320493 A1 * | 10/2020 | Drucker | G06Q 40/06 |

FOREIGN PATENT DOCUMENTS

| | | | | |
|---|---|---|---|---|
| CA | 2670148 A1 * | 8/2007 | ............ | G06Q 40/00 |
| JP | 2005301328 A * | 10/2005 | ............ | G06Q 40/02 |
| JP | 2008512775 A * | 4/2008 | | |

* cited by examiner

*Primary Examiner* — Kenneth Bartley
(74) *Attorney, Agent, or Firm* — Greenblum & Bernstein, P.L.C.

(57) ABSTRACT

A method for providing portfolio deviation analytics to facilitate collateral management is disclosed. The method includes retrieving trade data from a source based on a predetermined schedule, the trade data including transaction information and valuations information; retrieving reference data from a reference data hub; parsing the reference data to identify portfolios and corresponding parameters; identifying a deviation amount for each of the portfolios based on the corresponding trade data and the corresponding parameters; determining a resolution action for each of the portfolios based on the corresponding deviation amount; and automatically initiating the resolution action.

18 Claims, 6 Drawing Sheets

METHOD AND SYSTEM FOR PROVIDING PORTFOLIO DEVIATION ANALYTICS

BACKGROUND

1. Field of the Disclosure

This technology generally relates to methods and systems for analyzing portfolios, and more particularly to methods and systems for providing portfolio deviation analytics to facilitate collateral management by identifying margin requirements and margin actions.

2. Background Information

Many financial service entities provide margin accounts to investors to facilitate security purchases. Often, exposure of each investment portfolio must be determined in real-time to maintain margin requirements and limit liabilities. Historically, implementation of conventional techniques for determining portfolio deviations have resulted in varying degrees of success with respect to real-time processing of client data based on service level agreements (SLAs).

One drawback of the conventional techniques is that in many instances, client exposure must be determined for each portfolio when a change in circumstance is detected. As a result, large quantities of client data must be analyzed in real-time to identify the change in circumstance, determine the client exposure, and initiate an appropriate resolution action. Additionally, each portfolio must be analyzed based on corresponding SLAs, which add additional criteria that must be considered.

Therefore, there is a need to provide real-time portfolio deviation analytics to facilitate collateral management by automatically identifying margin requirements and margin actions.

SUMMARY

The present disclosure, through one or more of its various aspects, embodiments, and/or specific features or sub-components, provides, inter alia, various systems, servers, devices, methods, media, programs, and platforms for providing portfolio deviation analytics to facilitate collateral management by identifying margin requirements and margin actions.

According to an aspect of the present disclosure, a method for providing portfolio deviation analytics to facilitate collateral management is disclosed. The method is implemented by at least one processor. The method may include retrieving trade data from at least one source based on a predetermined schedule, the trade data may include transaction information and valuations information; retrieving reference data from at least one reference data hub; parsing the reference data to identify at least one portfolio and at least one corresponding parameter; identifying a deviation amount for each of the at least one portfolio based on the corresponding trade data and the at least one corresponding parameter; determining at least one resolution action for each of the at least one portfolio based on the corresponding deviation amount; and automatically initiating the at least one resolution action.

In accordance with an exemplary embodiment, the at least one source may include at least one risk management system, the at least one risk management system may relate to at least one from among a first-party system and a third-party system.

In accordance with an exemplary embodiment, the at least one portfolio may be identified in the reference data by using an identifier that is associated with each of the at least one portfolio.

In accordance with an exemplary embodiment, the method may further include parsing the reference data to determine whether a reference data element in the reference data is stale; identifying a trade data element in the trade data that corresponds to the reference data element; and updating the reference data element with the corresponding trade data element when the reference data element is stale.

In accordance with an exemplary embodiment, the at least one resolution action may include a margin requirements summary and a margin action call.

In accordance with an exemplary embodiment, the margin requirements summary may include information that relates to the at least one portfolio and a corresponding risk exposure.

In accordance with an exemplary embodiment, the margin action call may include at least one from among a payment request action and a payment initiation action.

In accordance with an exemplary embodiment, the reference data for each of the at least one portfolio may be updated based on corresponding information that relates to the at least one resolution action.

In accordance with an exemplary embodiment, the deviation amount may be automatically determined for each of the at least one portfolio when a change is detected in the corresponding trade data, the change may correspond to a modification of the at least one portfolio that results in an altered risk exposure.

According to an aspect of the present disclosure, a computing device configured to implement an execution of a method for providing portfolio deviation analytics to facilitate collateral management is disclosed. The computing device including a processor; a memory; and a communication interface coupled to each of the processor and the memory, wherein the processor may be configured to retrieve trade data from at least one source based on a predetermined schedule, the trade data may include transaction information and valuations information; retrieve reference data from at least one reference data hub; parse the reference data to identify at least one portfolio and at least one corresponding parameter; identify a deviation amount for each of the at least one portfolio based on the corresponding trade data and the at least one corresponding parameter; determine at least one resolution action for each of the at least one portfolio based on the corresponding deviation amount; and automatically initiate the at least one resolution action.

In accordance with an exemplary embodiment, the at least one source may include at least one risk management system, the at least one risk management system may relate to at least one from among a first-party system and a third-party system.

In accordance with an exemplary embodiment, the processor may be further configured to identify the at least one portfolio in the reference data by using an identifier that is associated with each of the at least one portfolio.

In accordance with an exemplary embodiment, the processor may be further configured to parse the reference data to determine whether a reference data element in the reference data is stale; identify a trade data element in the trade data that corresponds to the reference data element; and update the reference data element with the corresponding trade data element when the reference data element is stale.

In accordance with an exemplary embodiment, the at least one resolution action may include a margin requirements summary and a margin action call.

In accordance with an exemplary embodiment, the margin requirements summary may include information that relates to the at least one portfolio and a corresponding risk exposure.

In accordance with an exemplary embodiment, the margin action call may include at least one from among a payment request action and a payment initiation action.

In accordance with an exemplary embodiment, the processor may be further configured to update the reference data for each of the at least one portfolio based on corresponding information that relates to the at least one resolution action.

In accordance with an exemplary embodiment, the processor may be further configured to automatically determine the deviation amount for each of the at least one portfolio when a change is detected in the corresponding trade data, the change may correspond to a modification of the at least one portfolio that results in an altered risk exposure.

According to an aspect of the present disclosure, a non-transitory computer readable storage medium storing instructions for providing portfolio deviation analytics to facilitate collateral management is disclosed. The storage medium including executable code which, when executed by a processor, may cause the processor to retrieve trade data from at least one source based on a predetermined schedule, the trade data may include transaction information and valuations information; retrieve reference data from at least one reference data hub; parse the reference data to identify at least one portfolio and at least one corresponding parameter; identify a deviation amount for each of the at least one portfolio based on the corresponding trade data and the at least one corresponding parameter; determine at least one resolution action for each of the at least one portfolio based on the corresponding deviation amount; and automatically initiate the at least one resolution action.

In accordance with an exemplary embodiment, the at least one resolution action may include a margin requirements summary and a margin action call.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
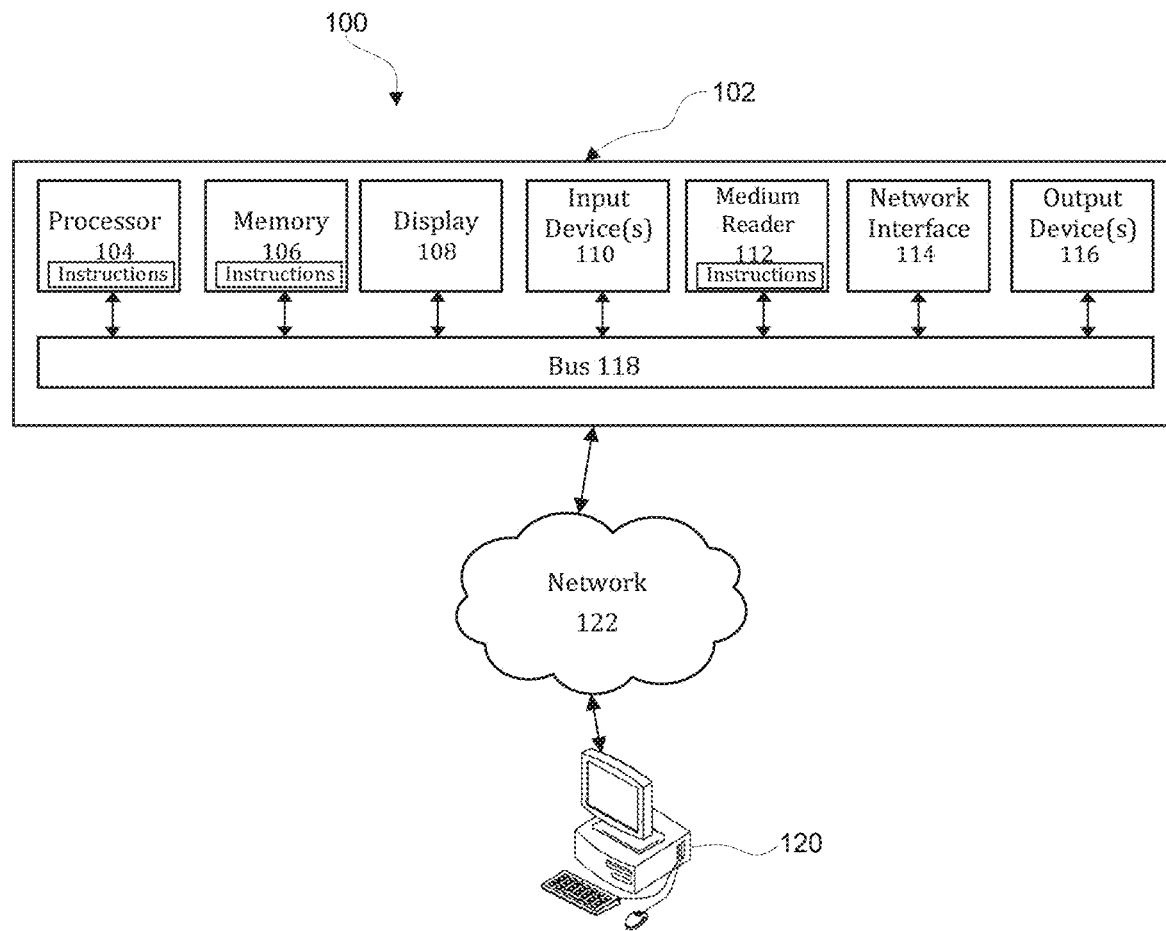
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing portfolio deviation analytics to facilitate collateral management by identifying margin requirements and margin actions.

Figure 2:
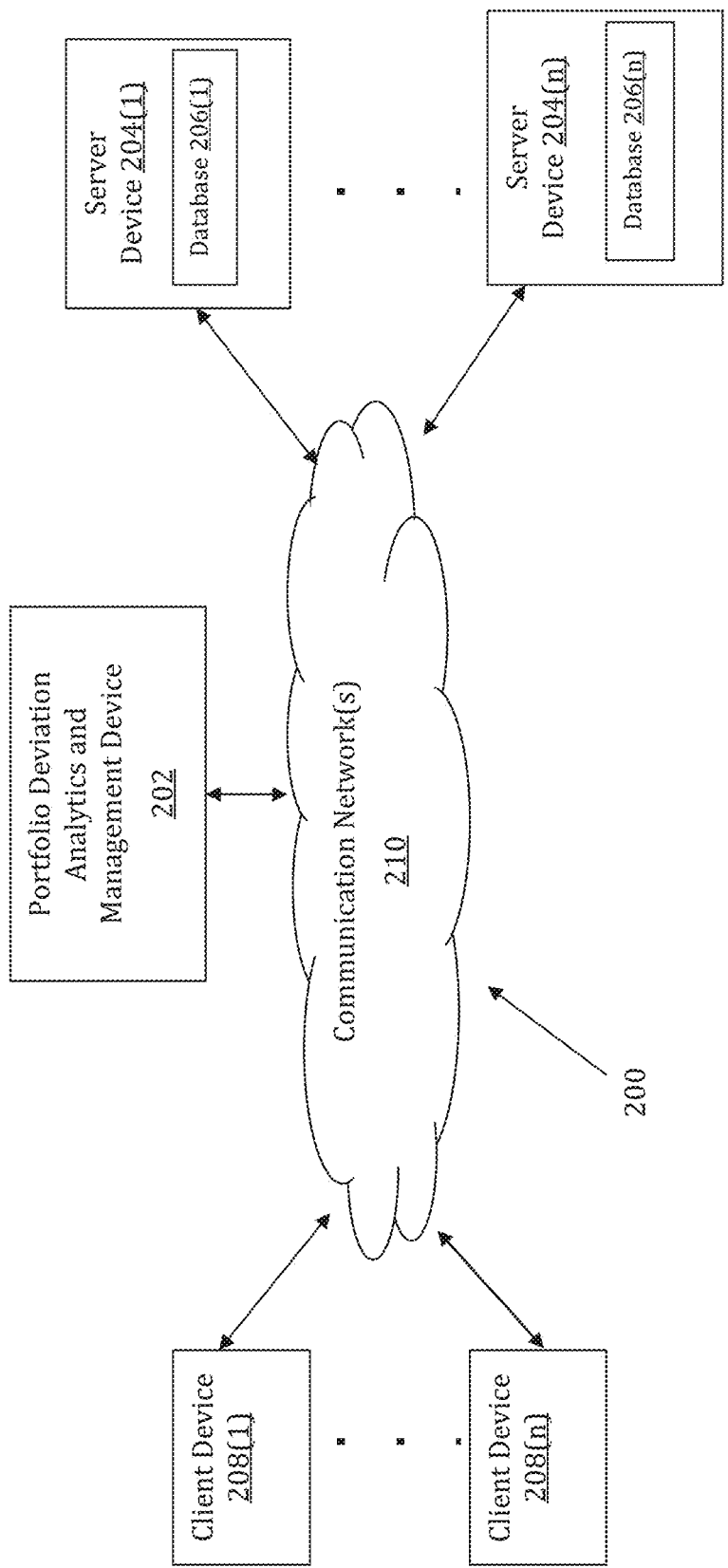
FIG. 2 illustrates an exemplary diagram of a network environment.

Referring to FIG. 2, a schematic of an exemplary network environment 200 for implementing a method for providing portfolio deviation analytics to facilitate collateral management by identifying margin requirements and margin actions is illustrated. In an exemplary embodiment, the method is executable on any networked computer platform, such as, for example, a personal computer (PC).

The method for providing portfolio deviation analytics to facilitate collateral management by identifying margin requirements and margin actions may be implemented by a Portfolio Deviation Analytics and Management (PDAM) device 202. The PDAM device 202 may be the same or similar to the computer system 102 as described with respect to FIG. 1. The PDAM device 202 may store one or more applications that can include executable instructions that, when executed by the PDAM device 202, cause the PDAM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PDAM device 202 itself, may be located in virtual server(s) running in a cloud-based computing environment rather than being tied to one or more specific physical network computing devices. Also, the application(s) may be running in one or more virtual machines (VMs) executing on the PDAM device 202. Additionally, in one or more embodiments of this technology, virtual machine(s) running on the PDAM device 202 may be managed or supervised by a hypervisor.

In the network environment 200 of FIG. 2, the PDAM device 202 is coupled to a plurality of server devices 204(1)-204(n) that hosts a plurality of databases 206(1)-206(n), and also to a plurality of client devices 208(1)-208(n) via communication network(s) 210. A communication interface of the PDAM device 202, such as the network interface 114 of the computer system 102 of FIG. 1, operatively couples and communicates between the PDAM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PDAM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PDAM devices that efficiently implement a method for providing portfolio deviation analytics to facilitate collateral management by identifying margin requirements and margin actions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PDAM device 202 may be a standalone device or integrated with one or more other devices or apparatuses, such as one or more of the server devices 204(1)-204(n), for example. In one particular example, the PDAM device 202 may include or be hosted by one of the server devices 204(1)-204(n), and other arrangements are also possible. Moreover, one or more of the devices of the PDAM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PDAM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to trade data, transaction information, valuations, reference data, portfolio data, deviation amounts, resolution actions, margin requirement summaries, and margin action calls.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PDAM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PDAM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PDAM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PDAM device 202, the server devices 204(1)-204(n), or the client devices 208(1)-208(n), for example, may be configured to operate as virtual instances on the same physical machine. In other words, one or more of the PDAM device 202, the server devices 204(1)-204(n), or the client devices 208(1)-208(n) may operate on the same physical device rather than as separate devices communicating through communication network(s) 210. Additionally, there may be more or fewer PDAM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
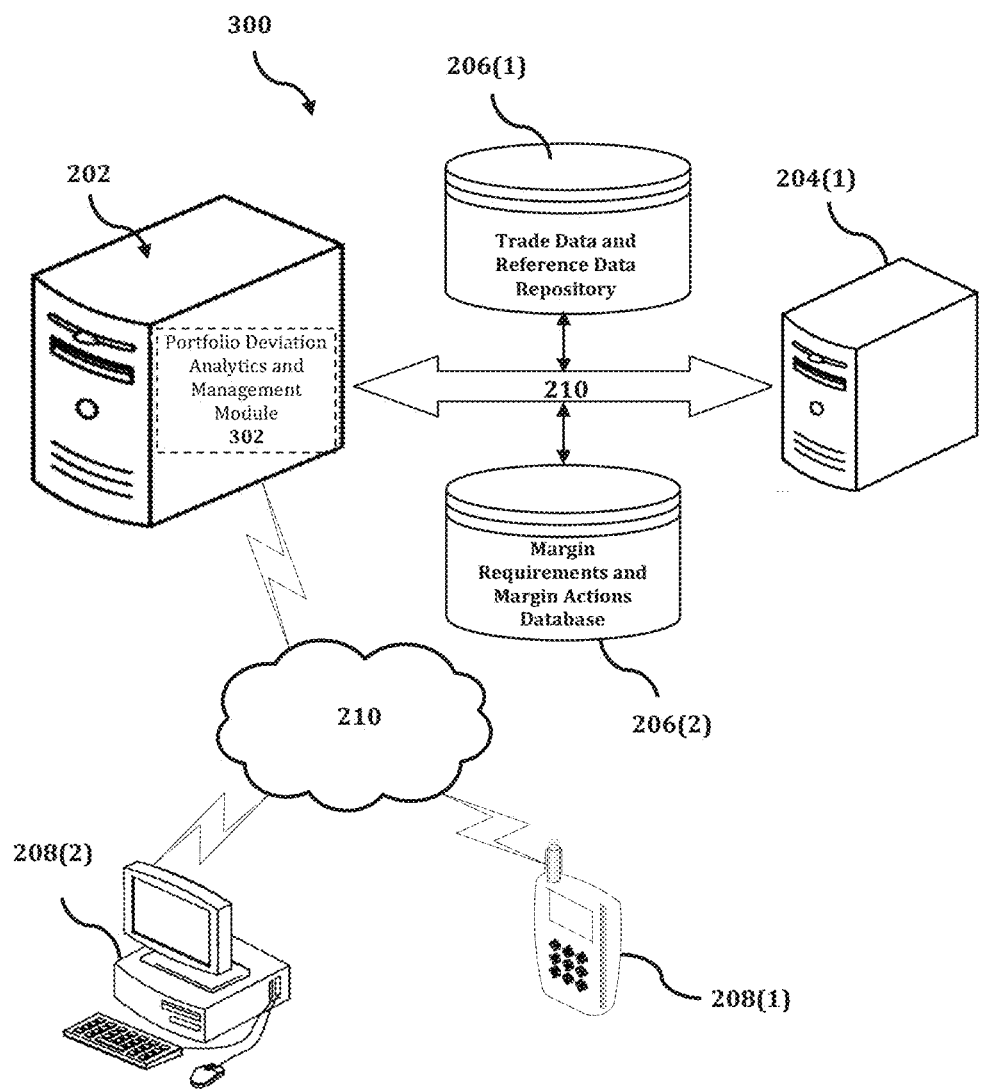
FIG. 3 shows an exemplary system for implementing a method for providing portfolio deviation analytics to facilitate collateral management by identifying margin requirements and margin actions.

The PDAM device 202 is described and shown in FIG. 3 as including a portfolio deviation analytics and management module 302, although it may include other rules, policies, modules, databases, or applications, for example. As will be described below, the portfolio deviation analytics and management module 302 is configured to implement a method for providing portfolio deviation analytics to facilitate collateral management by identifying margin requirements and margin actions.

An exemplary process 300 for implementing a mechanism for providing portfolio deviation analytics to facilitate collateral management by identifying margin requirements and margin actions by utilizing the network environment of FIG. 2 is shown as being executed in FIG. 3. Specifically, a first client device 208(1) and a second client device 208(2) are illustrated as being in communication with PDAM device 202. In this regard, the first client device 208(1) and the second client device 208(2) may be "clients" of the PDAM device 202 and are described herein as such. Nevertheless, it is to be known and understood that the first client device 208(1) and/or the second client device 208(2) need not necessarily be "clients" of the PDAM device 202, or any entity described in association therewith herein. Any additional or alternative relationship may exist between either or both of the first client device 208(1) and the second client device 208(2) and the PDAM device 202, or no relationship may exist.

Further, PDAM device 202 is illustrated as being able to access a trade data and reference data repository 206(1), and a margin requirements and margin actions database 206(2). The portfolio deviation analytics and management module 302 may be configured to access these databases for implementing a method for providing portfolio deviation analytics to facilitate collateral management by identifying margin requirements and margin actions.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PDAM device 202 via broadband or cellular communication. Of course, these embodiments are merely exemplary and are not limiting or exhaustive.

Upon being started, the portfolio deviation analytics and management module 302 executes a process for providing portfolio deviation analytics to facilitate collateral management by identifying margin requirements and margin actions. An exemplary process for providing portfolio deviation analytics to facilitate collateral management by identifying margin requirements and margin actions is generally indicated at flowchart 400 in FIG. 4.

Figure 4:
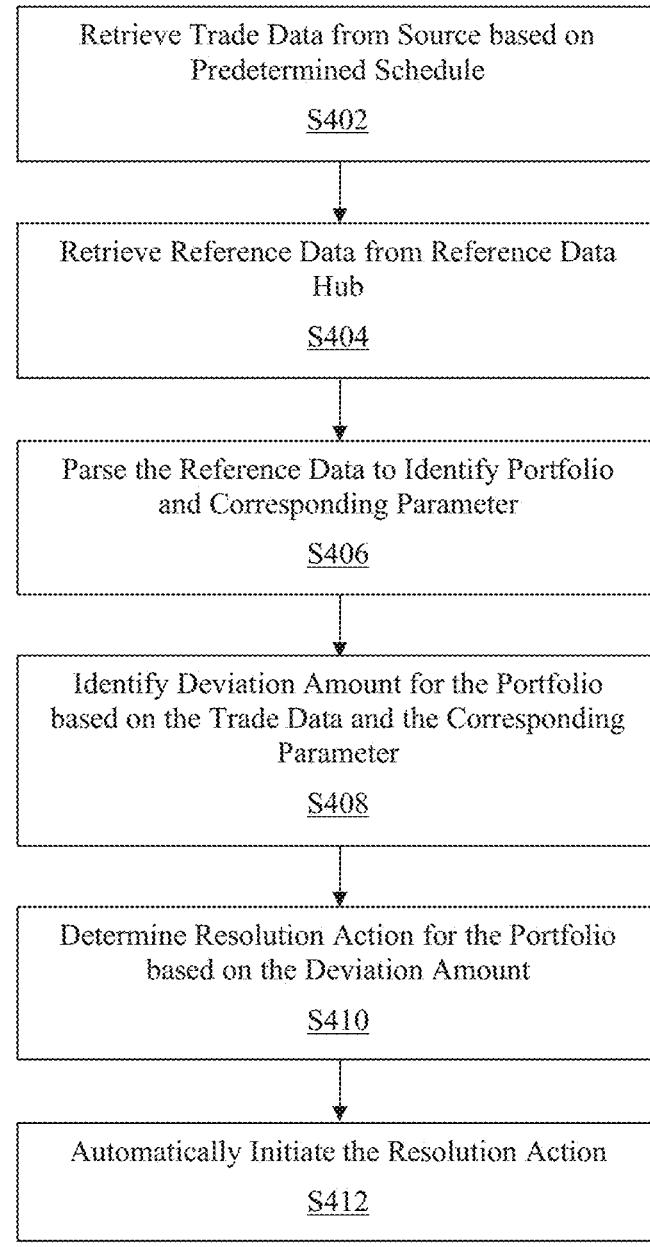
FIG. 4 is a flowchart of an exemplary process for implementing a method for providing portfolio deviation analytics to facilitate collateral management by identifying margin requirements and margin actions.

In the process 400 of FIG. 4, at step S402, trade data may be retrieved from a source based on a predetermined schedule. The trade data may include transaction information and valuations information. For example, the trade data may include transaction pricing, foreign exchange (FX) rates, included financial instruments, and participant credit ratings. In an exemplary embodiment, the source may include a risk management system. The risk management system may relate to at least one from among a first-party system and a third-party system. For example, the first-party system may correspond to an internal trade matching system and the third-party system may correspond to an external exchange platform. In an exemplary embodiment, the trade data may be fed from the risk management system. The trade data from the risk management system may include risk information that relates to the exposure of a plurality of financial transactions. The risk information may include a score for each of the plurality of financial transactions.

In another exemplary embodiment, the trade data may be retrieved based on a predetermined schedule for a geographic location. The predetermined schedule may correspond to a reoccurring schedule such as, for example, once a day as well as to a targeted schedule such as, for example, when a large financial transaction occurs. The geographic location may correspond to a predetermined region such as, for example, a northeastern region that is delineated based on a shared characteristic such as, for example, a proximity characteristic. In another exemplary embodiment, the trade data may be retrieved as a structured data set and an unstructured data set. The unstructured data set may be further processed to structure the trade data into a predetermined data format.

At step S404, reference data may be retrieved from a reference data hub. In an exemplary embodiment, the reference data may include information that relates to at least one from among a financial instrument, a corresponding portfolio, and an associated client. The information that relates to the financial instrument may include a financial instrument type, a current price, and an outstanding quantity. The information that relates to the corresponding portfolio may include composition information, margin information, and exposure information. The information that relates to an associated client may include client account data, client activity data, and agreement data such as, for example, service level agreement (SLA) data.

In another exemplary embodiment, the reference data hub may include at least one from among a first-party client data repository and a third-party client data repository. The first-party client data repository may include an internal client data storage system such as, for example, a client directory that is accessible via an application programming interface. The third-party data repository may include an external client data storage system such as, for example, a data aggregation vendor that is accessible via a public network such as, for example, an internet network. In another exemplary embodiment, the reference data may be retrieved as a structured data set and an unstructured data set. The unstructured data set may be further processed to structure the reference data into the predetermined data format.

At step S406, the reference data may be parsed to identify a portfolio and at least one corresponding parameter. In an exemplary embodiment, each component element of the reference data may be analyzed to identify the portfolio. The component element may correspond to a single unit of information in a data storage format such as, for example, in a tabular data storage format. In another exemplary embodiment, the portfolio may be identified in the reference data by using an identifier that is associated with the portfolio. The identifier may correspond to a context identifier that includes a combination of attributes such as, for example, a business day attribute, a client agreement number attribute, and a calculation methodology attribute. The client agreement number attribute may include a client identifier together with corresponding contract details such as, for example, legal entity information.

In another exemplary embodiment, the portfolio may correspond to a collection of financial investments. The financial investments may include stocks, bonds, commodities, cash, and cash equivalents such as, for example, closed-end funds and exchange traded funds. In another exemplary embodiment, the portfolio may correspond to a collection of assets. The assets may include real estate, art, and private investments. In another exemplary embodiment, the portfolio may relate to a current investment position of an associated client. The investment position may correspond to a net holding of the client in one or more markets at a particular time. In another exemplary embodiment, the corresponding parameter may relate to a characteristic of the portfolio. The characteristic may be defined based on a corresponding SLA. For example, the corresponding SLA may indicate a margin characteristic of the portfolio.

At step S408, a deviation amount may be identified for the portfolio based on the corresponding trade data and the corresponding parameter. In an exemplary embodiment, the deviation amount may correspond to an amount by which the balance of a margin account exceeds or falls below an initial margin. The deviation amount may represent a change in position of the portfolio.

In another exemplary embodiment, the deviation amount may be automatically determined for the portfolio when a change is detected in the corresponding trade data. The change may correspond to a modification of the portfolio that results in an altered risk exposure. In another exemplary embodiment, the deviation amount may be determined ad hoc based on a user input. The user input may be received via a graphical user interface.

At step S410, a resolution action for the portfolio may be determined based on the corresponding deviation amount. The resolution action for the portfolio may be determined when the corresponding deviation amount exceeds a predetermined threshold. In an exemplary embodiment, the resolution action may include a margin requirements summary. The margin requirements summary may correspond to generated documentation that includes information relating to the portfolio and a corresponding risk exposure. The corresponding risk exposure may include a current risk exposure as well as a predicted risk exposure.

In another exemplary embodiment, the resolution action may include a margin action call that, when initiated, nullifies the deviation amount. The margin action call may include at least one from among a payment request action and a payment initiation action. The payment request action may include a client request such as, for example, a cash deposit request, a securities deposit request, and a liquidated investments request to raise additional funds to offset the deviation amount. The payment initiation action may include a broker action to transfer funds to the client to offset the deviation amount.

In another exemplary embodiment, the resolution action for the portfolio may be determined based on the corresponding deviation amount by using a model. The model may relate to a predictive model that determines the resolution action based on a historical pattern of a plurality of resolution actions. In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S412, the resolution action may be automatically initiated. In an exemplary embodiment, the resolution action may be automatically initiated according to an SLA without additional user interaction. The resolution action may be automatically initiated consistent with present disclosures to nullify the corresponding deviation amount. In another exemplary embodiment, a notification is generated and transmitted to a user prior to initiation of the resolution action. The notification including information relating to the resolution action, the portfolio, the corresponding deviation amount, and the client as well as an approval request to automatically initiate the resolution action.

In another exemplary embodiment, the reference data may be parsed to determine whether a reference data element in the reference data is stale. The stale reference data element may not accurately reflect current conditions because the stale reference data element does not include the most recent data. In another exemplary embodiment, the reference data may be compared to recent events to determine whether the recent events have caused recent changes that are not reflected in the reference data. The reference data may be determined to be stale when the recent changes are not reflected in the reference data. In another exemplary embodiment, the reference data may be associated with a predetermined time threshold such as, for example, a day, a week, or a month. The reference data may be determined to be stale when the age of the reference data exceeds the associated predetermined time threshold.

Then, a trade data element that corresponds to the reference data element may be identified in the trade data. The reference data element may be updated with the corresponding trade data element when the reference data element is stale. In another exemplary embodiment, the reference data for the portfolio may be updated based on corresponding information that relates to the resolution action. The updating of the reference data for the portfolio may correspond to a feedback loop that is usable to ensure data fidelity.

Figure 5:
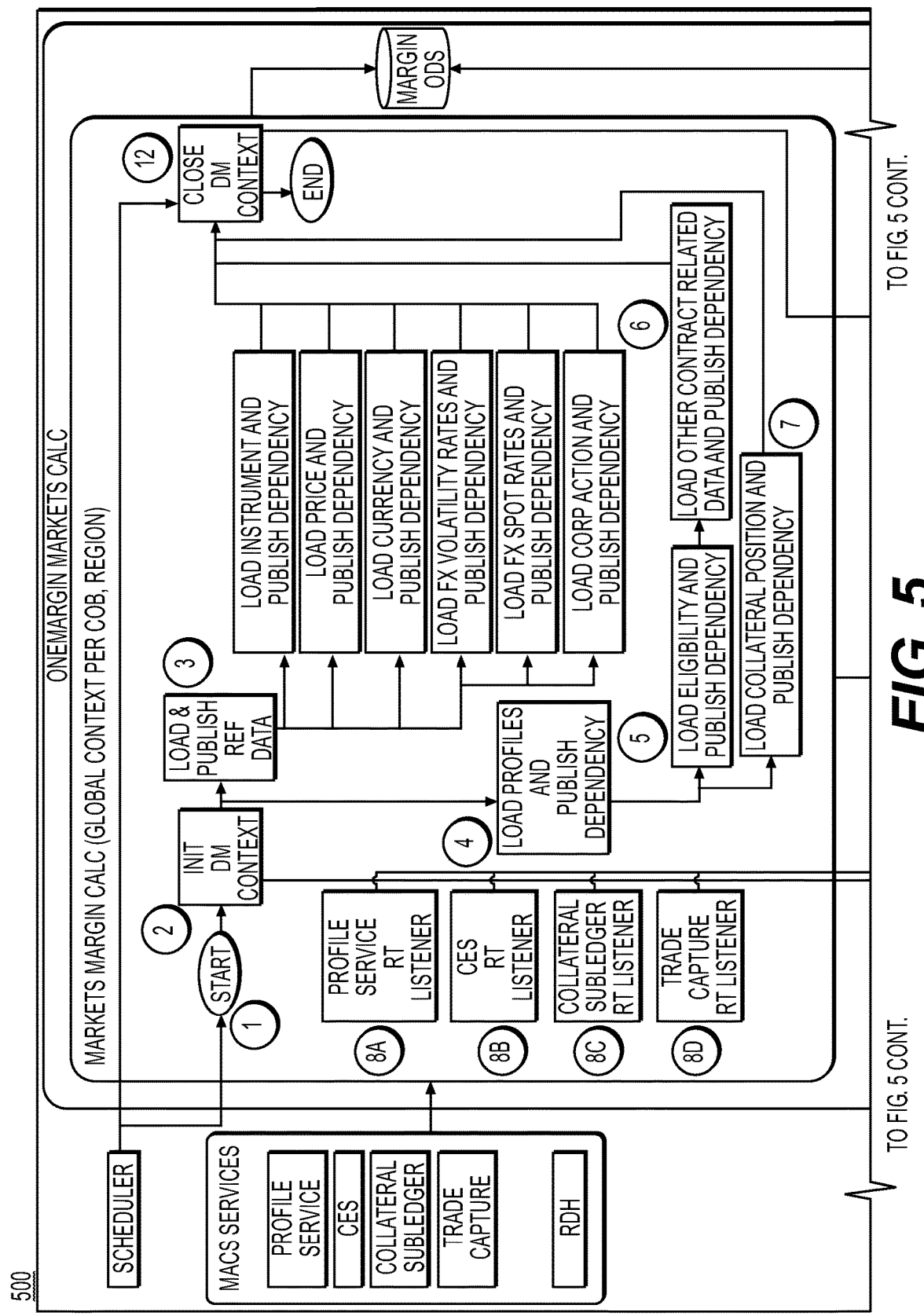
FIG. 5 is a flow diagram of an exemplary process for implementing a method for providing portfolio deviation analytics to facilitate collateral management by identifying margin requirements and margin actions.
Figure 5:
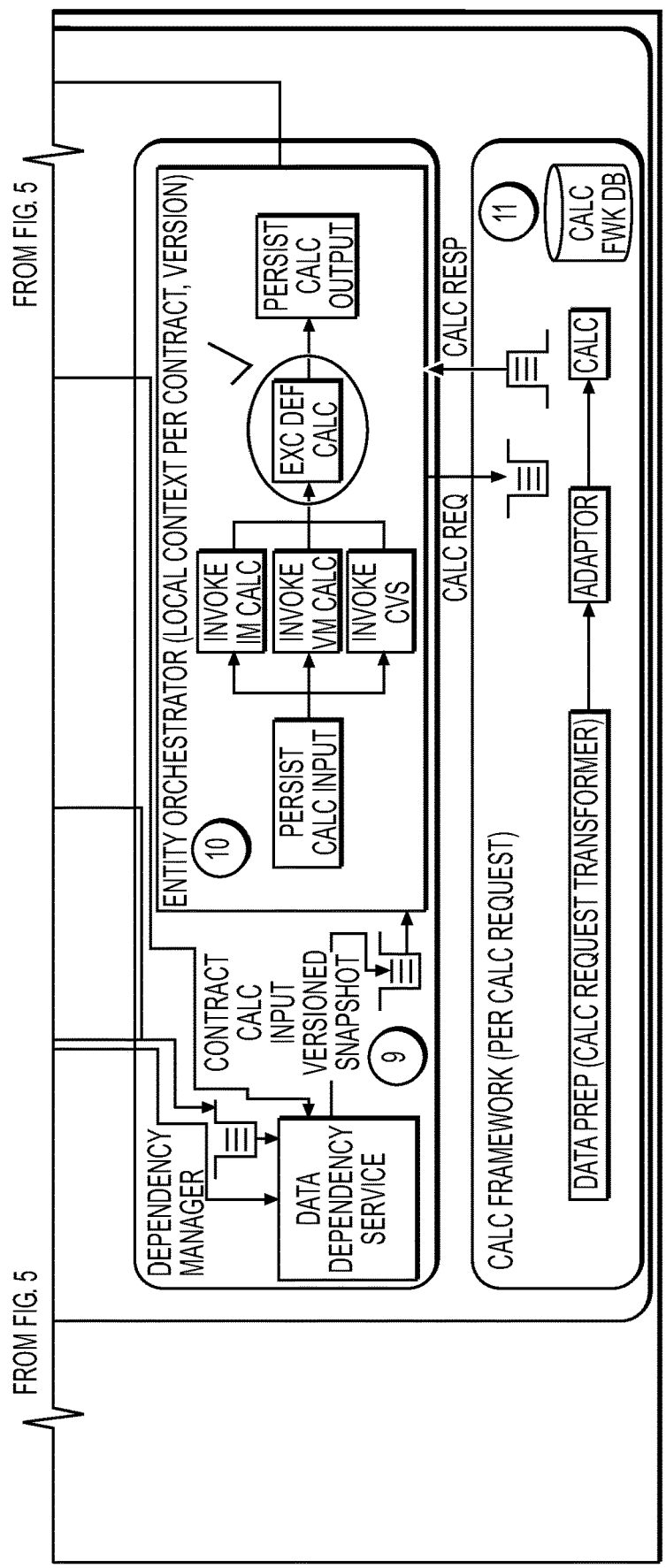

FIG. 5 is a flow diagram 500 of an exemplary process for implementing a method for providing portfolio deviation analytics to facilitate collateral management by identifying margin requirements and margin actions. In FIG. 5, the claimed invention is embodied as an application that is integrated in an application network. The claimed invention may perform processes consistent with present disclosures.

In an exemplary embodiment, the application may include at least one from among a web application, a monolithic application, and a microservice application. The monolithic application may describe a single-tiered software application where the user interface and data access code are combined into a single program from a single platform. The monolithic application may be self-contained and independent from other computing applications.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Accordingly, with this technology, an optimized process for providing portfolio deviation analytics to facilitate collateral management by identifying margin requirements and margin actions is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing portfolio deviation analytics, the method being implemented by at least one processor, the method comprising:

generating, by the at least one processor, a predictive model by using an artificial neural network;
training, by the at least one processor using training data, the predictive model based on a model assessment method that includes at least one from among a holdout method, a K-fold-cross-validation method, and a bootstrap method;
assessing, by the at least one processor, the predictive model to determine whether a least squares error rate is within a predetermined range;
automatically deploying, by the at least one processor, the predictive model when the least squares error rate is within the predetermined range;
retrieving, by the at least one processor, at least one data set from at least one source based on a predetermined schedule for a geographic location that is delineated based on a shared characteristic, the at least one data set including at least one structured data set and at least one unstructured data set;
retrieving, by the at least one processor via an application programming interface, reference data from at least one reference data hub;
updating, by the at least one processor, the reference data by,
parsing, by the at least one processor, the reference data to determine whether a reference data element in the reference data is stale,
wherein the reference data is associated with a predetermined time threshold, and
wherein the reference data element is determined to be stale when an age of the reference data element exceeds the associated predetermined time threshold;
identifying, by the at least one processor, a data element in the at least one data set that corresponds to the reference data element; and
updating, by the at least one processor, the reference data element with the corresponding data element when the reference data element is stale;
parsing, by the at least one processor, the updated reference data to identify at least one portfolio and at least one corresponding parameter;
identifying, by the at least one processor, a deviation amount for each of the at least one portfolio based on the corresponding at least one data element and the at least one corresponding parameter;
determining, by the at least one processor using the automatically deployed predictive model, at least one resolution action for each of the at least one portfolio based on the corresponding deviation amount, the automatically deployed predictive model including a machine learning model that uses a historical pattern of a plurality of resolution actions; and
automatically initiating, by the at least one processor, the at least one resolution action.

2. The method of claim 1, wherein the at least one source includes at least one risk management system, the at least one risk management system relating to at least one from among a first-party system and a third-party system.

3. The method of claim 1, wherein the at least one portfolio is identified in the reference data by using an identifier that is associated with each of the at least one portfolio.

4. The method of claim 1, wherein the at least one resolution action includes a requirements summary and an action call, the requirements summary corresponding to generated documentation.

5. The method of claim 4, wherein the requirements summary includes information that relates to the at least one portfolio.

6. The method of claim 4, wherein the action call includes at least one from among a request action and an initiation action.

7. The method of claim 4, wherein the reference data for each of the at least one portfolio is updated based on corresponding information that relates to the at least one resolution action.

8. The method of claim 1, wherein the deviation amount is automatically determined for each of the at least one portfolio when a change is detected in the corresponding at least one data set, the change corresponding to a modification of the at least one portfolio.

9. A computing device configured to implement an execution of a method for providing portfolio deviation analytics, the computing device comprising:
a processor;
a memory; and
a communication interface coupled to each of the processor and the memory,
wherein the processor is configured to:
generate a predictive model by using an artificial neural network;
train, by using training data, the predictive model based on a model assessment method that includes at least one from among a holdout method, a K-fold-cross-validation method, and a bootstrap method;
assess the predictive model to determine whether a least squares error rate is within a predetermined range;
automatically deploy the predictive model when the least squares error rate is within the predetermined range;
retrieve at least one data set from at least one source based on a predetermined schedule for a geographic location that is delineated based on a shared characteristic, the at least one data set including at least one structured data set and at least one unstructured data set;
retrieve, via an application programming interface, reference data from at least one reference data hub;
update the reference data by further causing the processor to:
parse the reference data to determine whether a reference data element in the reference data is stale,
wherein the reference data is associated with a predetermined time threshold, and
wherein the reference data element is determined to be stale when an age of the reference data element exceeds the associated predetermined time threshold;
identify a data element in the at least one data set that corresponds to the reference data element; and
update the reference data element with the corresponding data element when the reference data element is stale;
parse the updated reference data to identify at least one portfolio and at least one corresponding parameter;
identify a deviation amount for each of the at least one portfolio based on the corresponding at least one data element and the at least one corresponding parameter;
determine, by using the automatically deployed predictive model, at least one resolution action for each of the at least one portfolio based on the corresponding deviation amount, the automatically deployed predictive model including a machine learning model that uses a historical pattern of a plurality of resolution actions; and automatically initiate the at least one resolution action.

10. The computing device of claim 9, wherein the at least one source includes at least one risk management system, the at least one risk management system relating to at least one from among a first-party system and a third-party system.

11. The computing device of claim 9, wherein the processor is further configured to identify the at least one portfolio in the reference data by using an identifier that is associated with each of the at least one portfolio.

12. The computing device of claim 9, wherein the at least one resolution action includes a requirements summary and an action call, the requirements summary corresponding to generated documentation.

13. The computing device of claim 12, wherein the requirements summary includes information that relates to the at least one portfolio.

14. The computing device of claim 12, wherein the action call includes at least one from among a request action and an initiation action.

15. The computing device of claim 12, wherein the processor is further configured to update the reference data for each of the at least one portfolio based on corresponding information that relates to the at least one resolution action.

16. The computing device of claim 9, wherein the processor is further configured to automatically determine the deviation amount for each of the at least one portfolio when a change is detected in the corresponding at least one data set, the change corresponding to a modification of the at least one portfolio.

17. A non-transitory computer readable storage medium storing instructions for providing portfolio deviation analytics, the storage medium comprising executable code which, when executed by a processor, causes the processor to:

generate a predictive model by using an artificial neural network;

train, by using training data, the predictive model based on a model assessment method that includes at least one from among a holdout method, a K-fold-cross-validation method, and a bootstrap method;

assess the predictive model to determine whether a least squares error rate is within a predetermined range;

automatically deploy the predictive model when the least squares error rate is within the predetermined range;

retrieve at least one data set from at least one source based on a predetermined schedule for a geographic location that is delineated based on a shared characteristic, the at least one data set including at least one structured data set and at least one unstructured data set;

retrieve, via an application programming interface, reference data from at least one reference data hub;

update the reference data by further causing the processor to:
  parse the reference data to determine whether a reference data element in the reference data is stale,
    wherein the reference data is associated with a predetermined time threshold, and
    wherein the reference data element is determined to be stale when an age of the reference data element exceeds the associated predetermined time threshold;
  identify a data element in the at least one data set that corresponds to the reference data element; and
  update the reference data element with the corresponding data element when the reference data element is stale;

parse the updated reference data to identify at least one portfolio and at least one corresponding parameter;

identify a deviation amount for each of the at least one portfolio based on the corresponding at least one data element and the at least one corresponding parameter;

determine, by using the automatically deployed predictive model, at least one resolution action for each of the at least one portfolio based on the corresponding deviation amount, the automatically deployed predictive model including a machine learning model that uses a historical pattern of a plurality of resolution actions; and automatically initiate the at least one resolution action.

18. The storage medium of claim 17, wherein the at least one resolution action includes a requirements summary and an action call, the requirements summary corresponding to generated documentation.

* * * * *